United States Patent [19]

Batcher

[11] Patent Number: 5,668,947
[45] Date of Patent: Sep. 16, 1997

[54] MICROPROCESSOR SELF-TEST APPARATUS AND METHOD

[75] Inventor: Kenneth William Batcher, Hudson, Ohio

[73] Assignee: Allen-Bradley Company, Inc., Milwaukee, Wis.

[21] Appl. No.: 634,483

[22] Filed: Apr. 18, 1996

[51] Int. Cl.$^6$ ............................................. G06F 11/00
[52] U.S. Cl. ............................ 395/183.06; 371/22.4; 371/22.6; 395/183.18; 395/183.21
[58] Field of Search ............. 395/183.06, 183.07, 395/183.18, 183.21; 371/22.2, 22.6, 25.1

[56] References Cited

U.S. PATENT DOCUMENTS

| | | | |
|---|---|---|---|
| 4,433,413 | 2/1984 | Fasang | 371/25.1 |
| 4,688,222 | 8/1987 | Blum | 371/25.1 |
| 4,817,093 | 3/1989 | Jacobs et al. | 371/251 |
| 4,903,199 | 2/1990 | Keenan et al. | 364/300 |
| 5,436,971 | 7/1995 | Armbrust | 380/23 |
| 5,444,716 | 8/1995 | Jarwala et al. | 371/22.3 |
| 5,515,384 | 5/1996 | Horton, III | 371/22.4 |

*Primary Examiner*—Robert W. Beausoliel, Jr.
*Assistant Examiner*—Dieu-Minh Le
*Attorney, Agent, or Firm*—Michael A. Jaskolski; John M. Miller; John J. Horn

[57] ABSTRACT

A method and apparatus for testing a digital integrated circuit (IC) for faults wherein the IC includes a memory, a microprocessor, an operand register, and a random data generator which is responsive to integrated circuit data indicative of the instantaneous IC state. A short test code including operational code instructions in the memory is performed by the microprocessor which manipulates data in the operand register. Periodically, the random data generator provides seed data to the microprocessor which changes the test code in a random manner and modifies the data stored in the operand register. At the end of a prescribed number of passes through the test code, the data generator produces an IC signature which can be compared to a known correct signature to identify IC faults.

23 Claims, 3 Drawing Sheets

TEST CODE ~24

1. SET UP ROUTINE

2. VARIABLE TEST CODE

– ENTRY #1
   INSTRUCTION A
   INSTRUCTION B
   INSTRUCTION C ...

– ENTRY #2
   INSTRUCTION M
   ...

– ENTRY #X
   INSTRUCTION X

~26

3. NON-VARIABLE RANDOMIZE CODE
   – BRANCH BACK IF
     GC ≠ 0

~28

KNOWN CORRECT SIGNATURE ~68

FIG. 4

VARIABLE TEST CODE

| PASS 1 | PASS 2 | PASS 3 ... |
|---|---|---|
| ENTRY #1 | ENTRY #1 | ENTRY #1 |
| INST. A | INST. C | INST. A |
| B | C | D |
| C | B | E |
| D | A | B |
| E | D | ⋮ |
| ⋮ | ⋮ | |

FIG. 3

MICROPROCESSOR SELF-TEST APPARATUS AND METHOD

FIELD OF THE INVENTION

This invention relates generally to digital integrated circuits, and more particularly to a method and an apparatus for high speed integrated circuit testing.

BACKGROUND OF THE INVENTION

An integrated circuit (IC) is an electrical circuit which includes resistors, capacitors, transistors and other well-known electrical components which are typically connected together on a small slice of silicon to form a plurality of gates. The gates in turn are configured to provide addresses, registers, multiplexers and other functional combinations required to perform logical operations.

A correctly manufactured IC includes various input and output leads. In normal operation the input leads receive various input signal combinations and the IC provides output signals as a function of the input signal combinations. A complete set of simultaneous output signals is referred to herein as an output signature.

To test IC integrity, testing procedures have been designed to excite IC gates with input signal combinations, observe output signatures, and compare output signatures to known correct output signatures. IC testing procedures have taken two general forms referred to herein as built-in self-test (BIST) and automatic test equipment (ATE) tests. BIST, as the name implies, incorporates special testing hardware on the IC itself. The most popular form of BIST, is called "SCAN BIST." Many variations of SCAN BIST exist but, in general, they all require among other things, special gates called "scan flip flops," clocking circuitry, and some type of cyclic redundancy check (CRC) generator.

Scan flip flops are capable of assuming both a functional state and a test state. In the functional state, BIST SCAN flip flops operate to perform instructions required by IC applications. In the test state, however, instead of performing required instructions, SCAN flip flops are reconfigured into a single expansive serial scan chain for test purposes.

During a test cycle, all SCAN flip flops are gated into their test state, forming the scan chain. The CRC generator provides pseudo-random test vectors, which are IC input combinations created to excite IC logic. The vectors are provided to the IC and are shifted along the scan chain. Typically, a reduced set of vectors including less than all possible vectors are provided so that most, but not all, of the IC logic is tested during a test cycle. After an entire reduced set of test vectors has been run, a compressed IC output signature (also created by a CRC generator) is read from the IC and compared to an error-free signature. This compressed output signature at the end of a test cycle is deterministic (i.e. is a function of all preceding IC input combinations and should be identical for each correctly built IC). Therefore, when the error free and final or end output signatures are not identical at the end of a test cycle, the IC is faulty.

Where the error free and final output signatures are identical, there is a degree of certainty that the IC was manufactured correctly. The degree of certainty is known as fault coverage, which is equal to the mount of logic in the IC stimulated and observed by the reduced test vector set compared to the total amount of logic in the IC. Typical fault coverage using the SCAN test method is approximately 98%.

While BIST methods provide acceptable fault coverage, they are disadvantageous for at least three reasons. First, BIST methods are relatively expensive because they require the above mentioned specialized on chip hardware, which typically has no function other than testing the IC.

Second, because SCAN flip flops must assume both functional and test states, their configurations are complex when compared to single state gates. Complex flip flop configurations result in slower performance during functional IC operation and, therefore, a lower overall IC speed. Moreover, routing scan chains also adds to test overhead, resulting in a slower chip.

Third, because BIST SCAN requires relatively complex chip hardware, the process of designing a BIST SCAN capable chip is relatively more labor intensive, which adds to overall chip cost.

Some of the problems associated with BIST SCAN methods are eliminated using ATE methods. In ATE methods, test hardware is provided in a testing module which is wholly separate from the IC. The testing module is used repetitively to test thousands of identical ICs. In ATE methods, each IC is placed in a testing module tester interface and IC input leads are stimulated with a plurality of test vectors. In ATE testing methods, output signatures are not compressed as input test vectors are altered. Therefore, test module hardware is required to observe an IC output signature for each test vector.

Here, test vectors are created by an engineer to excite as much IC logic as possible. Each specific vector is aimed at testing a specific section of IC logic and, when applied, causes a deterministic response from the IC. By comparing IC responses to known correct responses, high fault coverage can be achieved.

ATE methods are advantageous because typical single state flip flops (i.e. flip flops capable of operating only in a functional state as opposed to functional and serial chain testing states) are relatively inexpensive, and, therefore, overall IC hardware costs are minimized. In addition, because single state flip flops are used, ATE hardware does not reduce IC speed when performing a functional program. Moreover, ATE methods allow functional testing of IC's without reconfiguration into scan chains.

Unfortunately, ATE methods also have a number of shortcomings. First, ATE test vectors are difficult to generate. Instead of using random inputs generated by a CRC generator as in BIST testing, specific ATE test vectors must be provided to excite IC logic. Second, because of the enormous number of possible test vectors, a large tester module memory is required to store ATE test vectors. Moreover, because ATE output signatures are not compressed, an output signature corresponding to each test vector should be compared to a separate correct signature to provide the greatest fault coverage possible. Therefore, tester module memory also must be provided to store thousands of correct signatures, one for each test vector, for comparison.

Third, ATE testing is slow due to the speed of the signals being tested; sampling times, wire delays, and other tester configuration limitations. Not only is ATE's reduced speed burdensome, but testing speed can have adverse effects on the reliability of tests. Some IC tests only can be meaningfully performed at full IC operating speed. These tests often exceed the capabilities of the most capable and expensive of currently available ATE units.

Fourth, while ATE testing may be somewhat practical when considering testing of general purpose IC's, ATE testing is inherently impractical when dealing with application specific integrated circuits (ASIC's). Recently, the IC industry has developed improved compiler design techniques which allow IC engineers to rapidly customize IC designs for specific applications. Rapid compiler design techniques have fueled a surge of ASICs which are tailored to application specific requirements, thus reducing IC hardware costs associated with standardized ICs. Unfortunately, because each application specific IC type has a unique hardware configuration, their advent has only exacerbated the ATE IC integrity testing task. Because different ASIC types incorporate different hardware configurations, unique sets of test vectors must be generated for each different ASIC type. Because test vectors must be provided by an engineer as opposed to a random generating mechanism, ATE testing of ASIC devices is extremely labor intensive.

Fifth, since ATE has limited access to the internal logic of the chip, it usually has lower fault coverage compared to BIST SCAN.

Therefore, while both BIST and ATE methods can be used to identify IC faults, both methods have disadvantages which have not been addressed by the industry. Therefore, it would be advantageous to have an IC testing method and apparatus which can test IC functions at operating frequencies and in a cost effective manner without requiring massive amounts of excess on-chip hardware or dedicated ATE devices.

SUMMARY OF THE INVENTION

The present invention provides a hardware assisted software self-test which combines a limited combination of test dedicated hardware on the IC and a short software test code to achieve a superior test methodology. The required on-chip test dedicated hardware includes, at least, a parallel cyclic redundancy check (CRC) generator that uses a polynomial having irreducible properties. Other IC hardware includes a memory, a microprocessor, and operand registers. These last three devices do not normally constitute test hardware since most microprocessors already have this hardware by definition. The short test code is stored in the memory and is performed by the microprocessor as a set of serial instructions which use the operand registers. A portion of the test code, including test code instructions which are individually identical to operational code instructions, is variable while a second part is non-variable and is used to periodically and randomly change instructions in the variable portion of the code.

During operation, the CRC generator receives data indicative of instantaneous IC states and compresses the received data to provide intermediate periodic IC signatures. In operation, the microprocessor steps through the variable portion of the test code while the CRC generator changes the intermediate IC signature each time an instruction executes. After the variable portion of the test code is completed, the microprocessor reads the intermediate IC signatures and uses these signatures as random seed data to alter the variable portion of the test code. In addition, the microprocessor uses the intermediate signatures to randomly change the data in the operand registers. Thereafter, the microprocessor steps through the variable code again using different instructions and different operands for those instructions. This cyclic code performance continues until a number of code passes have occurred. The number of passes is calculated to provide a final signature word which provides a necessary fault coverage. Thereafter, the final signature word is compared to a known correct signature word stored in on-chip memory, and IC errors can be identified.

One object of the present invention is to provide a built in self-test method and apparatus wherein a reduced aggregate of test dedicated hardware is required. In the present invention, normal single state flip flops (i.e. flip flops that are only capable of functional operation and not capable of serial chain test operation as in BIST SCAN testing) are required, which reduces fabrication and labor costs associated with design and manufacturing. In addition, cost is reduced because testing hardware, which is wholly separate from the IC as in ATE testing methods, is not required.

Another object of the invention is to provide a test methodology and apparatus which can test ICs at their operating frequency and which can test ICs using test code which is identical to operational code. Unlike ATE testing, with the present invention, testing occurs at the normal IC operating frequency so that operating frequency errors can be detected. In addition, unlike BIST SCAN testing, with the present invention, test code identical to operational code can be used instead of using a set of serial code which has no relation to IC operational code. During testing with the present invention, all of the IC hardware operates as if functioning normally (i.e. an adder operates as an adder, a subtractor operates a subtractor, etc.).

Yet another object of the present invention is to allow testing using test code which is identical to operational code without requiring a massive mount of dedicated memory. With the present invention, thousands of sequences of test code identical to possible operational code are generated using the CRC generator to provide random seed data to the microprocessor for modifying the test code during a testing period. In this way, only a small amount of memory is required for generating all necessary test code instruction sequences.

Yet another object of the present invention is to provide thousands of test code sequences without requiring an engineer to generate those sequences. With the present invention, the CRC generator and microprocessor cooperate to randomly generate the required test code sequences.

A further object of the invention is to provide a testing method which meets all of the above identified objectives and does not slow down IC operation during normal functional operation; as does the typical BIST SCAN hardware configurations. In the present case, because the flip flops required to configure the IC hardware are less complex than SCAN flip flops, IC speed is not reduced in order to provide the testing apparatus.

Other and further aspects of the present invention will become apparent from the description that follows and by a reference to the accompanying drawings.

DESCRIPTION OF THE PREFERRED EMBODIMENT

The present invention will be described in the context of the IC identified as 10 in FIG. 1 which includes, among other components, a memory 12, a microprocessor 16, and operand registers 14. The memory 12 consists of a small random access memory, or RAM, used to store a large number of IC instructions which together form an operational code performed by the microprocessor 16. Typical operational code instructions include addition, subtraction, comparison, load, store, branch instructions, ladder logic instructions, and the like. The operation code in the memory 12 can be altered by the microprocessor itself by simply executing instructions which override the old instructions, rewriting a new code into memory 12 over the old code. A partition of the memory 12 (area 19) is used to hold the IC instructions which are changed by the IC. As will be explained in detail below, this memory partition 19 is important for implementing the present invention.

In the preferred embodiment, the operand register 14 includes twenty register slots R-0 through R-19, which are used to store various data words (i.e., operands) which are manipulated by the microprocessor 16 according to the operational code instruction set in memory 12. For example, a typical addition instruction may require that the operand in slot R-3 be added to the operand in slot R-19 and resultant be placed in slot R-1. The microprocessor 16 has access to the memory 12 and the operand register 14 via what will be referred to as a first main bus (first bus) B-1.

To perform an instruction, the microprocessor 16 sends a fetch command to the memory via bus B-1 to fetch the next instruction in the operational code to be performed. Upon receiving the instruction, the microprocessor 16 analyzes the instruction to determine the function to be performed. Continuing with the example above, where the instruction is an addition of the words in slots R-3 and R-19 and placement of the resultant word in slot R-1, the microprocessor 16 sends separate read commands on the first bus B-1 to the operand register 14 requesting the R-3 and R-19 words. When the R-3 and R-19 words are received, the microprocessor 16 adds the words and then returns the resultant via a write command on bus B-1 to slot R-1.

In the preferred embodiment, the microprocessor 16 is capable of manipulating thirty-two bits of parallel data at a time. Similarly, the first bus B-1 can transfer 32-bit words and register slots R-0 through R-19 are each capable of storing 32-bit words. Thus, all fetch instructions as well as read and write data on the first bus B-1 are 32-bit words.

While each operational code instruction itself is relatively simple to perform (i.e. addition, store, move) and the circuit logic required is relatively elementary; an entire operational instruction code sequence is often extremely complex, and the logic required to perform the code can be perplexing. A small error in a calculation due to imperfect hardware may not substantially affect the outcome of a specific calculation. However, where the calculation error is propagated through several thousand subsequent calculations, the error can result in senseless and unusable output data. To this end, IC integrity testing is extremely important.

A. Testing Hardware

Unique testing hardware required for the present invention will now be described. In order to facilitate built-in self-testing, the present IC 10 includes minimal additional hardware which is used to randomly drive the microprocessor 16 through thousands of instructions identical to typical operational code instructions. The additional hardware periodically modifies both data in the operand register slots R-0 through R-19 and a test code which is stored in the RAM 19 portion of the memory 12 so that a large number of possible operational code sequences are performed during a testing period. At the end of a testing period, the additional hardware provides an IC signature which, when compared to a known correct or desired signature, can flag IC faults and provide greater than 95% fault coverage.

In addition to the above described components, the present IC includes a parallel cyclic redundancy check (CRC) generator 18. In addition, the preferred embodiment must have access to a 32-bit 2×1 multiplexer (MUX) 69. Typically, the microprocessor 16 cannot provide required multiplexing capabilities. However, where the microprocessor 16 cannot provide required multiplexing capabilities, an additional test dedicated MUX 69 should be provided. The CRC generator 18 includes both a CRC compressor 20 and a CRC register 22.

The CRC compressor 20 is capable of receiving and providing 32 bits of parallel data. Similarly, the CRC register 22 is capable of storing a 32-bit word in single bit slots S-0 through S-31. The CRC compressor 20 has constant access via bus 32 to the current data stored in the CRC register 22 and also periodically receives data via 32-bit bus 30. When the compressor 20 receives data on bus 30, the compressor 20 compresses the data (from bus 30 with the data on feedback loop 32 from the CRC register 22) and provides a compressed and updated 32-bit word to the CRC register 22 via bus 34.

One object of the present invention is to provide an output IC signature at the end of a test period for comparison to a known correct IC signature stored in memory. To this end, during a testing period, IC data is periodically observed every cycle. The observed IC data is provided to the compressor 20 and is compressed into a single IC signature which is stored in the CRC register 22. The observed IC data should be indicative of the instantaneous IC state and, to the extent possible, should not be redundant so that the resulting IC signature is imbued with IC-related information. To accomplish this the CRC generator 18 is configured so as to have pseudo random properties of an irreducible polynomial.

The most accessibly source of data indicative of IC state is the first main bus B-1 which passes 32-bit fetch instructions and read and write data. Bus B-1 is continually changing and therefore is indicative of instantaneous IC state. However, bus B-1 data can be redundant. For example, continuing with the above example, suppose the words in slots R-3 and R-19 have been added and are then written to memory. Bus B-1 data during the next read of memory to place the sum in slot R-1 will be identical to bus B-1 data previously written to the memory (i.e. the resultant of adding words R-3 and R-19). Compressing bus B-1 data during both the write to memory and subsequent read of memory would be redundant and would not increase fault coverage. Therefore, in the preferred embodiment, data on bus B-1 is only provided to the compressor 20 during read cycles. This means that during write and fetch cycles other data indicative of instantaneous IC state can be compressed.

During a test cycle, there are typically several concealed points within IC hardware which are so remote from the first bus B-1 that signals at those points only very rarely effect data on bus B-1. While signals at the concealed points are important when determining IC integrity, observing bus B-1 data cannot yield concealed point data. To observe concealed points, a second 32-bit main bus B-2 is provided. Each of the thirty-two lines of bus B-2 is connected to an observation signal for observing the state at a different concealed point. Observed concealed points are referred to herein as observations points. Data from the second bus B-2 is compressed by the CRC compressor 20 during both the write and fetch cycles.

In operation, all bus B-1 data is observed and provided to one 32-bit input of MUX 69 via a 32 bit bus 33. Bus B-2 provides observation point data to a second 32-bit input of MUX 69. While executing a test code the microprocessor 16 fetches instructions and reads and writes data on the first bus B-1 and sends a select signal via line 35 to the MUX 69. The microprocessor 16 uses the select signal to select the B-1 data on bus 33 each time bus B-1 data corresponds to a read command. In all other cases (i.e. write and fetch commands), the select signal on line 35 is used to select bus B-2 data. In this way, the compressor 20 is continually compressing non-redundant data which is indicative of instantaneous IC state. The resulting IC signature in the CRC register 22 at the end of the test period is clearly indicative of previous IC states during the test period and therefore is indicative of IC integrity.

In addition to providing the final IC signature at the end of a test period, the CRC generator 18 also provides intermediate IC signatures after each data compression which are used to randomize the test code and data in the operand register 14 as will be described in more detail below. For the purposes of this explanation, an intermediate IC signature in the CRC register 22 will be referred to as a CRCR word.

B. Software

In addition to the CRC generator 18 and MUX 69, the present invention also requires a software test code used to step the microprocessor 16 through a large number of operational code sequences.

The present invention overcomes the memory problems associated with ATE testing by allocating a small RAM 19 portion of the memory 12 for storing a concise test code including an abbreviated set of code instructions. To provide the required number of code sequences, the software, microprocessor 16 and CRC generator 18 cooperate to periodically and randomly modify a portion of the test code.

Figure 2:
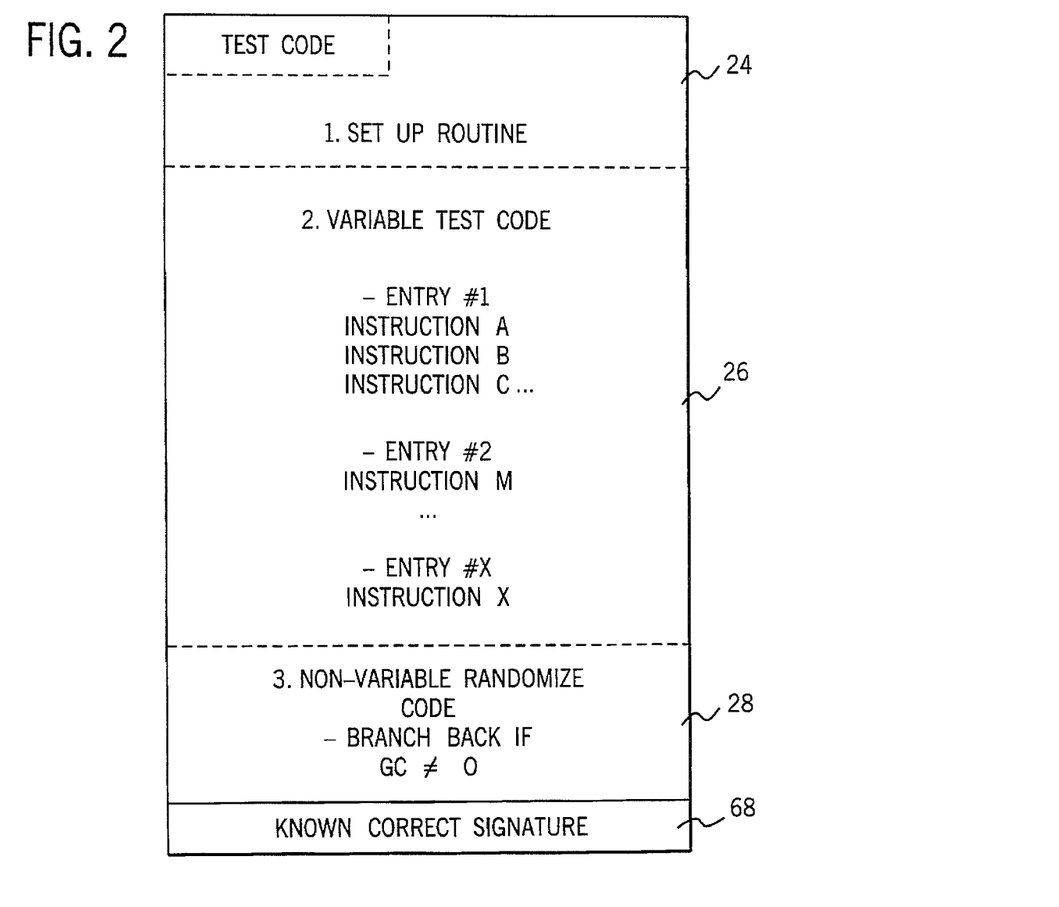
FIG. 2 is a chart showing a typical test code, which is used to control the microprocessor of FIG. 1 during a testing routine according to the present invention.

Referring also to FIG. 2, an exemplary test code includes a setup routine 24, a variable test code 26 and a non-variable randomize code 28. The setup routine 24 sets initial register and variable values prior to testing. The variable test code 26 includes sets of instructions referred to as Entry 1, Entry 2, ..., Entry X. Each entry includes a small group (8 to 10) of similar microprocessor instructions. Variable test code instructions are individually identical to operational code instructions that control the microprocessor during normal IC operation. Therefore, variable test code instructions in Entry #1 might be ALU instructions while those in Entry #5 might be instructions related to ladder logic manipulation. The variable test code 26 is typically short, including only a small number of instructions in each entry. As the name implies, the variable test code is modified periodically during testing as will be described below.

One of the problems with running a relatively small test code to identify IC faults is that each instruction only excites a small portion of the IC logic. It follows that an IC signature generated using a small instruction set would have an unacceptably small fault coverage. Moreover, fault coverage with a single small instruction set is further limited by the fact that instruction operation is oftentimes dependent upon previous instructions in a test code and on which IC hardware has been most recently stimulated, and on the data operands manipulated by the instructions. Therefore, it is insufficient to simply test each separate possible microprocessor instruction and assume that the microprocessor works appropriately where each separate instruction yields a desired result. Rather, for acceptable fault coverage, a large number of test code instruction combinations must be performed. To this end, according to the method of the present invention, after a first pass through the variable test code, the non-variable randomize code 28 uses the CRCR word as seed data to randomly modify certain fields of the instructions in the variable test code 26 stored in RAM 19, thus randomly changing the instructions. Then the microprocessor again steps through the modified variable test code 26, performing a second pass. During the second pass, the MUX 69 and CRC generator 18 cooperate to compress IC state indicative data from the first B-1 and second B-2 main buses with the CRCR word many times during the second cycle, thus updating the CRCR word by the end of the second pass. At the end of the second pass, the CRCR word is again used to modify the variable test code 26. This cyclic variable test code modification ensures that the microprocessor 16 steps through a large number of instruction sequences to provide a high fault coverage. In addition to being used to randomly alter the variable test code 26 after each pass, the CRCR word is also used to periodically and randomly alter the 32-bit words in register slots R-0 through R-19. Words in slots R-0 through R-19 are used as operands by the microprocessor instructions. In this way, IC testing is further randomized and fault coverage is further increased.

C. Operation

Referring again to FIG. 1, to start an IC testing procedure according to the inventive method, first the microprocessor 16 downloads the short test code from off-chip memory (not shown) into the on-chip RAM 19.

Figure 3:
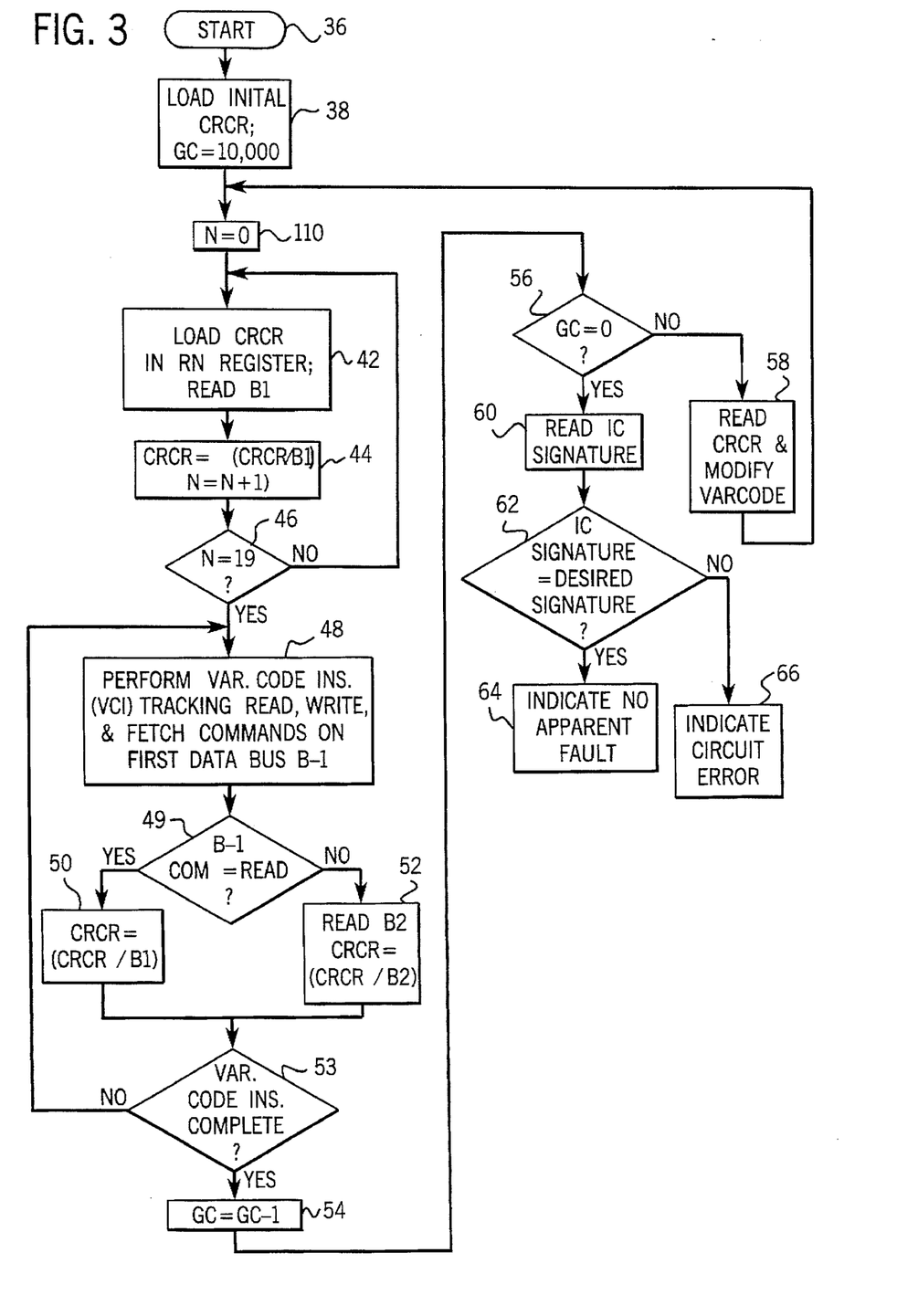
FIG. 3 is a flow chart depicting operation of an IC according to the present invention.

Referring also to FIGS. 2 and 3, after the test code is downloaded, an internal microprocessor counter jumps to the first line in the test code and begins the setup routine 24 at start block 36. At block 38, the setup routine 24 loads an initial 32-bit CRCR word into the CRC register 22 and sets a global counter (GC) to a predetermined number corresponding to a number of variable test code passes calculated to render an acceptable fault coverage. The initial CRCR word and short test program are always the same for a specific IC type and, therefore, the final IC signatures should be identical where ICs are correctly manufactured. In a preferred embodiment, the global GC value is 10,000. At block 110, a register slot counter N is set to zero. At block 42 the current CRCR word is loaded into register slot R-N in register 14 where N corresponds to the current value of the register slot counter N. To load the CRCR word into slot R-N, first the microprocessor 16 reads the CRCR word and then writes the word to the appropriate slot R-N.

In the preferred embodiment as described above, each time the microprocessor 16 issues a read command, the bus B-1 data on bus 33 is passed via bus 30. Any compression routine which is well-known to those skilled in the art could be used here. One preferred method would be to divide the bus B-1 data by the current CRCR word using a characteristic CRC polynomial. The data compression creates a new CRCR word containing compressed information indicative of the immediately previous IC state. After the data is compressed, the slot counter N is increased by one. At decision block 46, the slot counter N is compared to a number indicating the number of slot registers R0–R-19. In the preferred embodiment, the number of operand registers is 20 and therefore N=19 (i.e. 0 through 19). If the slot counter N is less than the number of registers, the setup routine 24 loops back to block 42, loads the modified CICR word into the next register slot RN, and recompresses to modify the CRCR word again at block 44. Looping continues until all of the register slots R-0 through R-19 are filled with initial test data. Importantly, the CRC characteristic polynomial is selected with primitive irreducible properties. Therefore, given an input stream, pseudo random data is obtained by compressing the CRCR word into the signature after each slot R-0 through R-19 is filled, which effectively fills all slots from R-0 to R-19 with different random data.

At block 48, the microprocessor 16 begins to perform the variable test code instructions (VCI) one at a time. Referring still to FIGS. 1 and 3, while performing the VCI, the microprocessor 16 monitors read, write, and fetch commands on the first bus B-1. At decision block 49, when data on the first bus B-1 has been read from memory, the microprocessor 16 compresses the current CRCR word and the bus B-1 data, generating a new CRCR word. However, when data on the first bus B-1 results from a write or fetch cycle, the microprocessor 16 and MUX 69 cooperate to select and pass bus B-2 data to the compressor 20.

At block 52, the compressor 20 compresses the current CRCR word and the bus B-2 data, modifying the CRCR word in the CRC register 22 accordingly. Thus, each time the microprocessor 16 reads or writes data, or fetches an instruction, the CRC compressor 20 compresses the current CRCR word and some other data indicating instantaneous IC state to modify the word.

Figure 1:
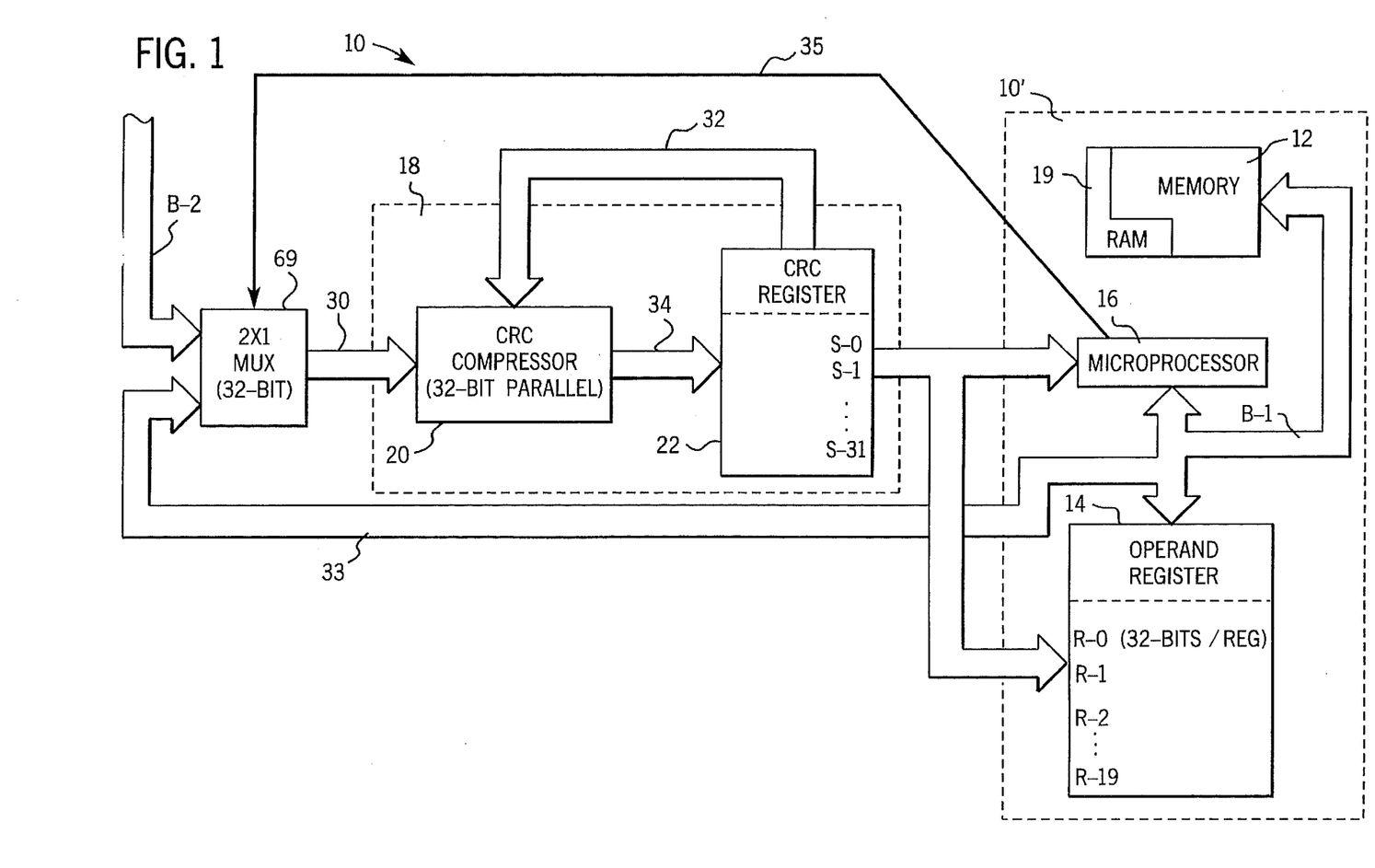
FIG. 1 is a block diagram of an integrated circuit according to the present invention.

Referring to FIGS. 1, 2 and 3, at decision block 53 the microprocessor 16 determines whether or not the last instruction in the variable test code 26 has been performed during the instantaneous variable test code pass. Where the last instruction has not been performed, microprocessor control loops back up to block 48 and performs the next VSI. Where all of the VSI have been completed, at block 54 the microprocessor begins to process the non-variable randomize code 28.

At block 54 the global counter GC is decremented by, 1 indicating that the variable code has been passed through entirely. At decision block 56, the global counter GC is compared to zero. Where the global counter GC is not zero (i.e. the required number of variable code passes have not been performed), at block 58 the microprocessor 16 reads the current CRCR word from register 22 and modifies the variable test code 26 as a function of the current CRCR word. In other words, the CRCR word is used as seed data to generate a new variable code. Methods to modify a code using random seed data are well-known to those skilled in the art and therefore will not be explained here in detail. It should suffice to say that given a specific CRCR word, the variable test code 26 is modified in a deterministic manner (i.e. identical CRCR words would modify the same test code in identical ways). While the nonvariable code 28 is being performed, the CRC generator 18 continues to compress data, thereby generating new random data each time an instruction is executed. Thus, a new random CRCR word is provided each time the intermediate signature is read as seed data to modify the VCI.

Figure 4:
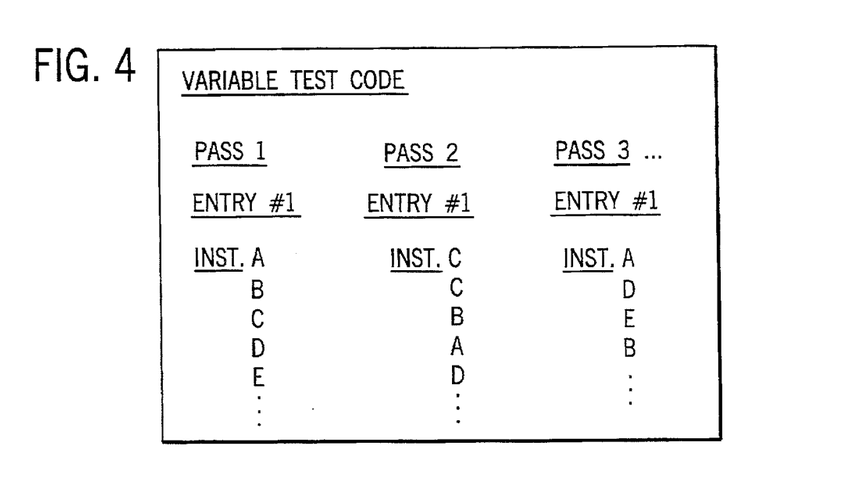
FIG. 4 is a chart showing the variable code portion of the test code in FIG. 2 during consecutive passes therethrough.

Referring to FIG. 4, portions of exemplary consecutive variable codes can be observed. Therein, during a first pass, Entry #1 includes a number of different instructions (i.e. A, B, C, D, E, ... ). Referring also to FIG. 3, after the first pass, at block 58 the variable code is modified. While the modified variable code has the same number of instructions as the initial variable code, certain fields (i.e. opcode, mode, register operands, etc.) within each instruction will typically vary between passes. In FIG. 4, the instruction set in Entry #1 during pass 2 is different than during pass 1. Similarly, the instruction set is different during pass 3.

Referring still to FIGS. 1, 2, and 3, after the variable code 26 is modified, the microprocessor 16 jumps back to block 40, resets the slot counter N, and loads the register slots R-0 through R-19 with new data from the CRC register 22. Again, each time the CRCR word is read from register 22 for loading, the compressor 20 compresses the current CRCR word with bus B-1 data to modify the CRCR word which will be provided to the next register slot R-N. After all the register slots R0–R19 have been reloaded, the microprocessor jumps back to the first line in the modified variable code at block 48 and begins to execute the modified variable code.

Referring still to FIG. 3, the processor described above continues in a repetitive fashion until the global counter GC equals zero indicating that the required number of variable code passes has occurred. When the global counter equals zero, the microprocessor reads the CRCR word from register 22 one last time at block 60. At this point, the CRCR word is referred to as the IC signature and reflects all of the previous states of the IC during the 10,000 passes through the variable code. Any computational errors due to hardware imperfections during any of the variable code passes propagate through the data compression's and show up in the IC signature as incorrect bit values. This well-known property is representative of CRC generators that use irreducible polynomials.

Referring to FIG. 2, in addition to the setup routine 24, variable 26 and non-variable 28 codes, the test code also includes a known correct or desired signature 68. The desired signature 68 is a 32-bit word which was generated using an IC of the type being tested which was known to have been flawlessly manufactured. The known correct signature 68 is generated during gate level simulations of the IC.

Referring again to FIG. 3, after the IC signature has been read at block 60, the microprocessor 16 compares the IC signature to the known correct signature at decision block 62. Where the IC and known correct signatures are not identical, at block 66 the microprocessor 16 indicates a faulty IC. However, where the signatures are identical, at block 64 the microprocessor 16 indicates no apparent fault. While it is extremely likely that a tested IC is flawless, because fault coverage is not 100%, there is, even after an affirmative test, some slight possibility of hardware fault. This is true for any type of ASIC self-test and is caused by unobvious logic and slight probability of error aliasing in the CRC generator.

After a test is completed, where there is no apparent IC fault, the microprocessor 16 can return to its normal operation and perform the normal operational code. If necessary, the microprocessor can write over the RAM 19 as the test code is typically permanently stored in some other off IC memory location. If the test indicates a fault, the IC should be replaced or, if practical repaired.

It should be noted that certain test code instructions would not be performed, and, therefore, when the variable test code is modified it may be necessary to mask out certain instructions. For example, a truly random set of instructions could chose an operand slot address which does not exist. In this case, performance of the test code would effectively spiral out of control and the IC signature would be worthless. To eliminate this possibility, a masking step would be added to the randomize code 28 which limits the operand fields accessible to the instructions to possible fields "legal" values (i.e. in this case R-0 through R-19). This masking step could be added to FIG. 3 prior to block 58 where the variable test code 26 is modified. Similarly, other instruction limiting masks may be required to limit instructions to performable instructions only.

Thus, it should be appreciated that the present invention includes a hardware assisted soft-ware self-testing apparatus and method for identifying hardware faults in ICs generally. The present method is particularly advantageous in that it drives IC hardware at its functional speed and performs test code instructions which are identical to operational code instructions. In addition, very little additional or special hardware is required to implement the present IC testing method. Moreover, the test method of the present invention can be done easily with the IC in its functional orientation by simply down loading required software into an on-chip memory and running the test protocol. Furthermore, because the CRC generator 18 provides random register and seed data, the present invention can test for IC faults without requiring excessive dedicated memory space which would be required to hold a larger test program.

While the present inventive apparatus and method is described above in a preferred embodiment, it should be clear to those skilled in the art that the present invention includes various modifications which would have been obvious to one of ordinary skill in the art and therefore, the present invention should not be limited to the preferred embodiments described above. For example, while the preferred embodiment above includes only two main buses B-1 and B-2, other embodiments may include three or more main buses wherein the third, fourth, and additional main buses are connected to the IC at other observation points to provide additional data to the CRC generator 18. In this case, the 2×1 MUX 69 would be a 3×1 or 4×1 MUX and data from the additional observation points would be compressed in a round-robin fashion by the generator 18.

In addition, while the method described above is described in the context of a separate testing procedure done at the factory during IC fabrication, an additional benefit to the present invention is that the testing protocol could be run in the field as a background support program to regularly update the status of the. IC. In the alternative, the testing program could be performed automatically by the IC periodically to update IC status. Where this is the case, the test code would be permanently stored in the memory 12 and run at a low level priority in a round-robin or other fashion which is well-known to those skilled in the art.

Moreover, while the invention is described above as having two main buses B-1 and B-2 and a 2×1 MUX it would be possible to practice the present invention having just the single first main bus B-1 continually compressing data from that main bus with the CRCR word to update the CRCR word. In this case, fault coverage would be slightly reduced as observation points, which are difficult to observe via the first bus B-1, would only minimally affect the final IC signature, the advantage being a lower overall cost.

Furthermore, the microprocessor 16 could be programmed to change the sequence of the multiplexer 69 so that the first bus B-1 data and the second bus B-2 data is provided to the generator 18 in many different patterns. The most important aspect of the present invention is that the generator 18 compresses IC related data often to randomly alter the variable test code. While some IC related data is clearly better than other IC related data for the purposes of generating a useful IC signature, the present invention is meant to cover compression of any type of IC related data. Which data is compressed and in what sequence the compressions take place is only important to the extent that some data will vary more quickly and, therefore, represent the instantaneous state of the IC more readily than other data.

In addition, while a large number of data buses are shown in FIG. 1, in reality, the inventive IC 10 would be implemented with fewer data buses. For example, the CRC compressor 20 and register 22 are usually formed by a single component, the register 22 comprising the output of the compressor 20. The additional buses and components have been included only to simplify this explanation and should not be considered as limiting the present invention.

Also, the memory required for storing the VCI could be provided off-chip instead of on-chip, the CRC generator and registers R-0 through R-19 communicating therewith through input and output buses. This would be advantageous where a chip does not require on-chip memory during normal operation and could further reduce chip costs.

Moreover, the CRC generator could be modified so that random CRCR words are somewhat weighted to provide pseudo random patterns known to give relatively better test coverage. This could be done in software using well-known weighting arithmetic operations.

To apprise the public of the scope of this invention, the following claims are made:

I claim:

1. A method of testing a digital integrated circuit for faults, the integrated circuit having access to a memory for storing a test code including a plurality of separate instructions and a known correct IC signature, a microprocessor for performing the test code, an operand register having a plurality of register slots for storing operands manipulated by the microprocessor according to the test code, a data bus for transferring bus data to and from the register slots and the memory, and a random data generator including a signature register storing a signature word, the method comprising the steps of:

a) supplying each register slot with initial register data and the signature register with an initial signature word;
   b) performing the test code and, while performing the test code, periodically combining the signature word and said bus data to provide a modified signature word;
   c) after performing the test code, altering the test code as a function of the modified signature word to provide a modified test code as the test code;
   d) repeating steps b) and c) for a predetermined number of passes through the test code;
   e) after said predetermined number of passes, comparing the signature word to the known correct IC signature; and
   f) where the signature word is not identical to the known correct IC signature, signaling a faulty integrated circuit.

2. The method of claim 1 wherein bus data includes read, write and fetch instruction data and the step of periodically combining the signature word and said bus data includes the step of combining the signature word and read data each time new read data is provided on the bus.

3. The method of claim 2 wherein said bus is a first bus and the integrated circuit includes a second bus, including lines connected to integrated circuit observation points other than those easily observable by way of the first bus and the method further includes the step of providing data on said second bus corresponding to the states of the observation points and, wherein, the step of periodically combining includes the step of combining the signature word and data from the second bus where data on the first bus is write fetch instruction data.

4. The method of claim 2 further including the steps of, prior to step e), separately reading a intermediate signature word into each operand register to provide new random data to each operand register wherein, after a signature word is read into one operand register, the read data is combined with the signature word to provide different random data prior to reading the signature word into the next operand register.

5. The method of claim 1 wherein the step of periodically combining further includes the step of compressing the signature word and the bus data each time the bus data is altered.

6. The method of claim 3 wherein the integrated circuit also includes more than two data buses and the additional data buses include lines connected to integrated circuit observation points other than those easily observable by the first bus or connected to the lines of the second bus, the method further including the step of, providing data on said additional buses corresponding to the states of associated observation points and wherein, the step of periodically combining includes the step of combining the signature word and data from the additional buses periodically when data on the first bus is write data or fetch instruction data.

7. The method of claim 3 wherein the step of periodically combining includes the step of combining the signature word and data from the second bus each time new write or fetch instruction data is provided on the first bus.

8. The method of claim 7 wherein the step of combining includes the step of compressing.

9. The method of claim 1 wherein, prior to modifying the test code, weights are applied to the random register data to ensure that the modified test code will include only possible test code.

10. The method of claim 1 wherein the step of combining includes the step of compressing the bus data and the signature word.

11. The method of claim 1 wherein the memory is an on-chip memory and the test code is initially stored in a remote off-chip memory, and the method further includes the step (a), loading the test code into the on-chip memory.

12. The method of claim 1 further including the step of, prior to altering the test code, weighting the modified signature word to provide a weighted word known to give relatively better test coverage, the weighted word being provided as the modified signature word.

13. An apparatus for testing a digital integrated circuit on a chip for faults, the apparatus including cooperating on circuit hardware and software, the apparatus comprising:

a microprocessor having access to a memory, the memory for storing a test code, including a plurality of instructions and a known correct IC signature, the instructions including a variable code portion, the microprocessor for performing said instructions;

operand registers for storing data which is manipulated by the microprocessor according to the test code;

a data bus for transferring bus data between the memory, microprocessor, and operand register;

a random data generator including a signature register for storing a signature word, the generator connected to the bus for observing bus data, the generator periodically combining bus data and the signature word to provide a new signature word, the new data signature word being changed each time the generator combines;

whereby, after the microprocessor performs the variable code portion, the microprocessor uses an instantaneous new signature word as random seed data to modify the variable code portion producing a modified variable code portion, and then performs the modified variable code portion, and, after modifying and performing the variable code portion a predetermined number of times, the microprocessor compares the instantaneous new signature word to the known correct signature word, thereafter indicating a faulty circuit when the instantaneous new signature and known correct signature words are not identical.

14. The apparatus of claim 13 wherein the operand register includes a plurality of register slots for storing operands which are manipulated by the microprocessor according to the test code and, between each two consecutive performances of the variable code portion, the microprocessor loads the new signature word into each register slot via the bus whereby the register is loaded with random data, the generator combining bus data and the new signature word after each slot is loaded so that each slot is loaded with a different new signature word.

15. The apparatus of claim 13 wherein bus data includes read, write, and fetch instruction data and the generator combines the bus data and the new signature word each time new read data is provided on the bus.

16. The apparatus of claim 15 wherein the bus is a first bus and the apparatus includes a second bus, lines of the second bus connected to integrated circuit observation points other than those easily observable via the first bus, the second bus providing second bus data to the generator, and wherein, the generator combines the second bus data and the signature word periodically to provide a new signature word.

17. The apparatus of claim 16 wherein the generator combines the second bus data and the signature word each time new write or fetch data is provided on the first bus.

18. The apparatus of claim 13 wherein the generator is a parallel cyclic redundancy check generator and the generator combines by compressing bus data and the signature word using an irreducible polynomial.

19. The apparatus of claim 16 further including more than two data buses, the buses in excess of the two buses being connected to integrated circuit observation points other than those easily observable by the first bus or connected to the second bus, the additional buses providing data to the generator, the generator periodically combining data from the additional buses and the signature word to provide a new signature word.

20. The apparatus of claim 13 wherein the bus, generator, microprocessor, operand registers, and memory are all capable of handling thirty-two bit parallel words.

21. The apparatus of claim 13 wherein the memory is an on-chip memory.

22. The apparatus of claim 13 Wherein the memory is an off-chip memory.

23. The apparatus of claim 13 where bus, generator, microprocessor, OP, registers and memory can handle 16-bit or n-bit words.

* * * * *